(12) United States Patent
Kwon

(10) Patent No.: US 8,691,451 B2
(45) Date of Patent: Apr. 8, 2014

(54) METHOD FOR CONTROLLING AMOUNT OF AIR SUPPLIED TO FUEL CELL

(75) Inventor: Hyuck Roul Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 895 days.

(21) Appl. No.: 12/572,251

(22) Filed: Oct. 1, 2009

(65) Prior Publication Data

US 2010/0304234 A1 Dec. 2, 2010

(30) Foreign Application Priority Data

May 27, 2009 (KR) ........................ 10-2009-0046583

(51) Int. Cl.
*H01M 8/06* (2006.01)
*H01M 8/04* (2006.01)

(52) U.S. Cl.
USPC .......................................... 429/414; 429/443

(58) Field of Classification Search
USPC ........................ 429/413–414, 428, 443–446
See application file for complete search history.

(56) References Cited

U.S. PATENT DOCUMENTS

| | | | | |
|---|---|---|---|---|
| 2005/0255340 | A1* | 11/2005 | Watanabe et al. | 429/12 |
| 2006/0263654 | A1* | 11/2006 | Goebel et al. | 429/13 |
| 2007/0287041 | A1* | 12/2007 | Alp et al. | 429/22 |

FOREIGN PATENT DOCUMENTS

| | | |
|---|---|---|
| JP | 2001-210348 A | 8/2001 |
| KR | 10-2005-0035334 A | 4/2005 |
| KR | 10-2006-0020928 A | 3/2006 |
| KR | 100747869 | 8/2007 |
| KR | 10-2008-0099021 A | 11/2008 |
| WO | 2006/095926 A2 | 9/2006 |

* cited by examiner

*Primary Examiner* — Jonathan G Leong
(74) *Attorney, Agent, or Firm* — Edwards Wildman Palmer LLP; Peter F. Corless; Stephen D. LeBarron

(57) ABSTRACT

The present invention provides a method for controlling the amount of air supplied to a fuel cell, which can prevent flooding and membrane dry-out in a fuel cell stack and, at the same time, ensure optimal performance of the fuel cell stack and a humidifier by supplying an optimal amount of air to the fuel cell stack at each operation condition.

For this purpose, the present invention provides a method for controlling the amount of air supplied to a fuel cell, the method including measuring the temperature and pressure of humidifier outlet (stack inlet) air, the temperature and pressure of stack outlet air, and the relative humidity of the humidifier outlet (stack inlet) air, and determining the stoichiometric ratio of air or the amount of air supplied to the stack based on the measurement results so as to adjust the relative humidity of the stack outlet air reach a target value.

4 Claims, 2 Drawing Sheets

METHOD FOR CONTROLLING AMOUNT OF AIR SUPPLIED TO FUEL CELL

CROSS-REFERENCE TO RELATED APPLICATION

This application claims under 35 U.S.C. §119(a) the benefit of Korean Patent Application No. 10-2009-0046583 filed May 27, 2009, the entire contents of which are incorporated herein by reference.

BACKGROUND (a) Technical Field

The present disclosure relates, in general, to a method for controlling the amount of air supplied to a fuel cell. More particularly, the present invention relates to a method for controlling the amount of air supplied to a fuel cell, which can prevent flooding and membrane dry-out in a fuel cell stack and, at the same time, ensure optimal performance of the fuel cell stack and a humidifier by supplying an optimal amount of air to the fuel cell stack at each operation condition.

(b) Background

In general, a typical fuel cell system comprises a fuel cell stack for suitably generating electricity by electrochemical reaction, a hydrogen supply system for suitably supplying hydrogen as a fuel to the fuel cell stack, an oxygen (air) supply system for suitably supplying oxygen containing air as an oxidant required for the electrochemical reaction in the fuel cell stack, a thermal management system (TMS) for suitably removing reaction heat from the fuel cell stack to the outside of the fuel cell system, controlling operation temperature of the fuel cell stack, and suitably performing water management function, and a system controller for suitably controlling overall operation of the fuel cell system. Preferably, the fuel cell system generates heat and water as well as electricity.

Preferably, the fuel cell stack consists of a plurality of unit cells, each unit cell preferably including an anode, a cathode and an electrolyte (electrolyte membrane). Preferably, hydrogen is suitably supplied to the anode ("fuel electrode") and oxygen containing air is suitably supplied to the cathode ("air electrode" or "oxygen electrode").

In certain preferred embodiments of the present invention, the hydrogen supplied to the anode is dissociated into hydrogen ions (protons, $H^+$) and electrons (e) by a catalyst that is suitably disposed in an electrode/catalyst layer. Preferably, the hydrogen ions are suitably transmitted to the cathode through the electrolyte membrane, which is a cation exchange membrane, and the electrons are suitably transmitted to the cathode through a GDL and a bipolar plate.

Preferably, at the cathode, the hydrogen ions supplied through a polymer electrolyte membrane and the electrons transmitted through the bipolar plate suitably react with the oxygen containing air supplied to the cathode to produce water.

Preferably, migration of the hydrogen ions causes electrons to flow through an external conducting wire, which generates electricity and heat.

In general, the amount of air supplied to the cathode of the fuel cell stack (hereinafter referred to as "stack") is about two times the stoichiometric ratio (SR). Further, the amount of air supplied to the stack has an effect on power output of the stack, system efficiency, relative humidity of air, and water balance. In particular, when the operation temperature is low such as during fuel cell system start-up or warm-up, flooding (over-condensation) may occur and, when the operation temperature is suitably raised such as during operation at high power, membrane dry-out may occur in the stack.

The reason why the flooding and membrane dry-out occur in the stack is described herein.

Generally, the amount of water suitably generated in the stack is proportional to the amount of current that is suitably generated in the stack. However, the amount of vapor that is contained in the air discharged from the stack differs according to the temperature and pressure of exhaust air.

Accordingly, when the temperature of the stack is suitably low and the pressure is suitably high, the amount of vapor contained in the air is considerably reduced, which means that the amount of water that is not evaporated but condensed in the stack is suitably increased. On the contrary, when the temperature is suitably high and the pressure is suitably low, the amount of vapor contained in the air is rapidly increased (e.g., refer to formula 1).

Accordingly, before the fuel cell is suitably warmed up or before the temperature of the stack reaches a normal level due to low power output, the amount of vapor contained in the air supplied to the stack is suitably reduced such that a substantial amount of water generated is condensed, thus causing flooding in the stack. In particular, the flooding occurring in the stack clogs the air channel or surrounds the catalyst layer, and can cause problems such as deterioration of fuel cell performance.

When the temperature of the stack is suitably high and the pressure is suitably low, the amount of vapor contained in the air is rapidly increased and, since the amount of vapor increased may be suitably greater than the amount of water generated in the stack, the water balance in the stack is broken to cause dry-out in the polymer electrolyte membrane. Accordingly, when the fuel cell is preferably continuously operated in a state where the relative humidity of the electrolyte membrane is suitably low, the polymer electrolyte membrane is suitably dried, and thus the power output and durability of the fuel cell may be suitably reduced.

Accordingly, it is important to properly control the humidity of the polymer electrolyte membrane in the stack and, for this purpose, the air supplied to the cathode of the stack is suitably maintained at an optimal level using a humidifier. However, since the humidifier uses the water generated by the electrochemical reaction of the stack to suitably humidify the air, it is necessary to consider the water balance in the stack.

Accordingly, the water balance may preferably be defined as {(the amount of water generated in the stack)−(the amount of water contained in the exhaust air of the stack (or fuel cell system)}. Accordingly, when the water balance is positive (+), it means that the amount of water in the stack is suitably sufficient, and the water balance is negative (−), it means that the amount of water in the stack is suitably insufficient. It is also possible to maintain the fuel cell in positive water balance when the amount of water generated in the fuel cell is suitably greater than the amount of water contained in the exhaust air.

Preferably, regarding the water balance, it is preferable that the amount of water generated in the fuel cell be greater (+) than the amount of water (vapor) contained in the exhaust water.

Preferably, during start-up, or when the operation temperature is suitably low and the operation pressure is suitably high, the water balance is maintained at a positive level, which means that the amount of vapor contained in the exhaust air is suitably smaller than the amount of water generated in the stack. The flooding (over-condensation) may occur in the stack outlet when the water generated by the electrochemical reaction of the stack is not evaporated but condensed when the absolute humidity is suitably low due to the low operation temperature, and, preferably, it is thus necessary to control the amount of air to suitably prevent the flooding from occurring in the stack outlet.

In particular, when the water generated by the electrochemical reaction is suitably discharged in the form of vapor in the exhaust air, the absolute amount of vapor contained in the air is suitably reduced when the operation temperature is low, which means that the water in the stack may be suitably condensed. Accordingly, it is necessary to prevent the flooding by suitably increasing the amount of air to control the amount of vapor contained in the exhaust air when the operation temperature is suitably low or the temperature pressure is suitably high.

When the operation temperature is suitably high or the operation pressure is suitably low, the amount of vapor contained in the air is rapidly increased to be greater than the amount of water generated in the stack. As a result, the water balance in the stack is suitably broken to cause the dry-out of the polymer electrolyte membrane, and thus it is necessary to suitably control the amount of air.

U.S. Patent Publication No. 20070287041, incorporated by reference in its entirety herein, is directed to a control system for a fuel cell stack that suitably maintains the relative humidity of the cathode inlet air above a predetermined percentage by doing one or more of decreasing stack cooling fluid temperature, increasing cathode pressure, and/or decreasing the cathode stoichiometric ratio when necessary to increase the relative humidity of the cathode exhaust gas that is used by a water vapor transfer device to humidify the cathode inlet air. The control system can also suitably limit the power output of the stack to keep the relative humidity of the cathode inlet air above the predetermined percentage.

However, the control system proposed by the above control system is to maintain the relative humidity of the stack inlet air at a desired level during initial stage and does not consider the operation temperature or pressure. In particular, when the operation temperature of the stack is suitably low, the flooding is most likely to occur in the stack outlet even though the relative humidity of the stack inlet air is suitably maintained at an optimal level. Further, when the operation temperature is high, membrane dry-out is most likely to occur in the stack outlet.

Although there are many methods for variably controlling the amount of air supplied by detecting the temperature and humidity of the stack inlet air, these methods are not directed to controlling the relative humidity of the stack outlet air to a desired level while suitably maintaining the water balance.

The above information disclosed in this Background section is only for enhancement of understanding of the background of the invention and therefore it may contain information that does not form the prior art that is already known in this country to a person of ordinary skill in the art.

SUMMARY

The present invention features a method for controlling the amount of air supplied to a fuel cell, which suitably controls operational conditions of a fuel cell stack, i.e., the amount of air suitably supplied to the stack within a predetermined range based on the temperature and pressure of stack outlet air, thus suitably maintaining water balance in the stack, suitably maintaining the relative humidity of the stack outlet air at a desired target value, and suitably preventing flooding (over-condensation) from occurring in the stack outlet.

In a preferred embodiment, the present invention provides a method for controlling the amount of air supplied to a fuel cell, the method including measuring or estimating the temperature and pressure (T_hto) and (P_hto) of humidifier outlet (stack inlet) air, the temperature and pressure (T_so) and (P_so) of stack outlet air, and the relative humidity (RH_hto) of the humidifier outlet (stack inlet) air; and determining the stoichiometric ratio ($SR_{air}$) of air or the amount of air (mdot_airin) supplied to the stack based on the measurement or estimation results, in order to preferably make the relative humidity of the stack outlet air reach a range of 90% to 120%, for example 90%, 95, %, 100%, 105%, 110%, 115%, or 120%, as a suitable target value.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered vehicles.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein.

Figure 1:
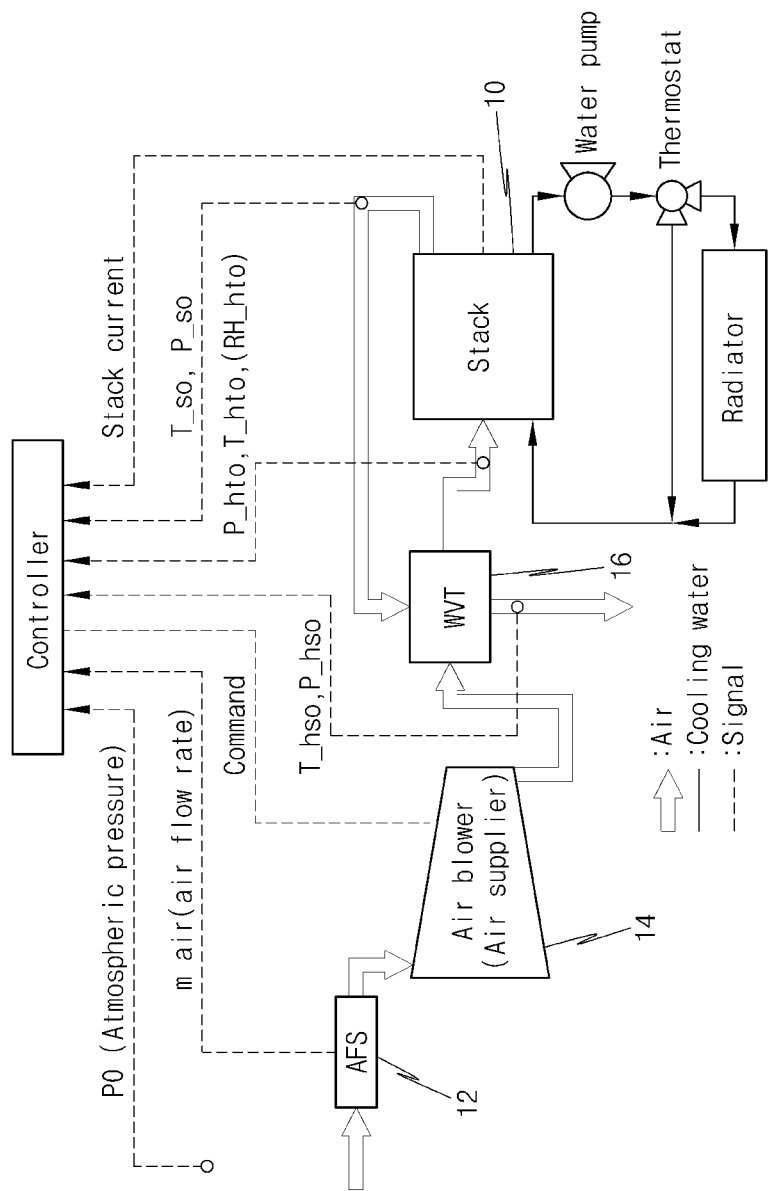
FIG. 1 is a block diagram illustrating an exemplary method for controlling the amount of air supplied to a fuel cell in accordance with preferred embodiments of the present invention.

Reference numerals set forth in the Drawings includes reference to the following elements as further discussed below:

10: fuel cell stack
12: AFS
14: air blower
16: humidifier

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The present invention provides, in one aspect, a method for controlling the amount of air supplied to a fuel cell, the method comprising measuring temperature and pressure of humidifier outlet (stack inlet) air, the temperature and pressure of stack outlet air, and the relative humidity of the humidifier outlet (stack inlet) air; and determining the stoichiometric ratio of air or the amount of air supplied to the stack based on the measurements.

In one embodiment, the stoichiometric ratio is determined in order to adjust the relative humidity of the stack outlet air to reach a target value.

In another embodiment, the measurement of temperature and pressure is an estimate.

In a related embodiment, the stoichiometric ratio of air is determined by obtaining the absolute humidity of the humidifier outlet air and the absolute humidity of the stack outlet air, and substituting the thus obtained relative humidities into a specific stoichiometric formula.

In a further embodiment, the absolute humidity of the humidifier outlet air and the absolute humidity of the stack outlet air is based on the temperature and pressure of the humidifier outlet air, the temperature and pressure of the stack outlet air, and the relative humidity of the humidifier outlet air, and substituting the thus obtained relative humidities into a specific stoichiometric formula.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

During fuel cell start-up or when the operation temperature is low, the water balance in a fuel cell stack is suitably maintained at a positive (+) level; however, flooding may occur in the stack outlet. This flooding phenomenon occurs when water generated by the electrochemical reaction of the stack is not suitably evaporated but condensed when the absolute humidity is low due to the low operation temperature.

Accordingly, in preferred embodiments, the present invention aims at variably controlling the amount of air supplied to the stack by suitably adjusting the stoichiometric ratio of air so as to maintain the relative humidity of the stack outlet inlet air within 100%, thus easily discharging water generated by the flooding to the outside using a humidifier.

Figure 2:
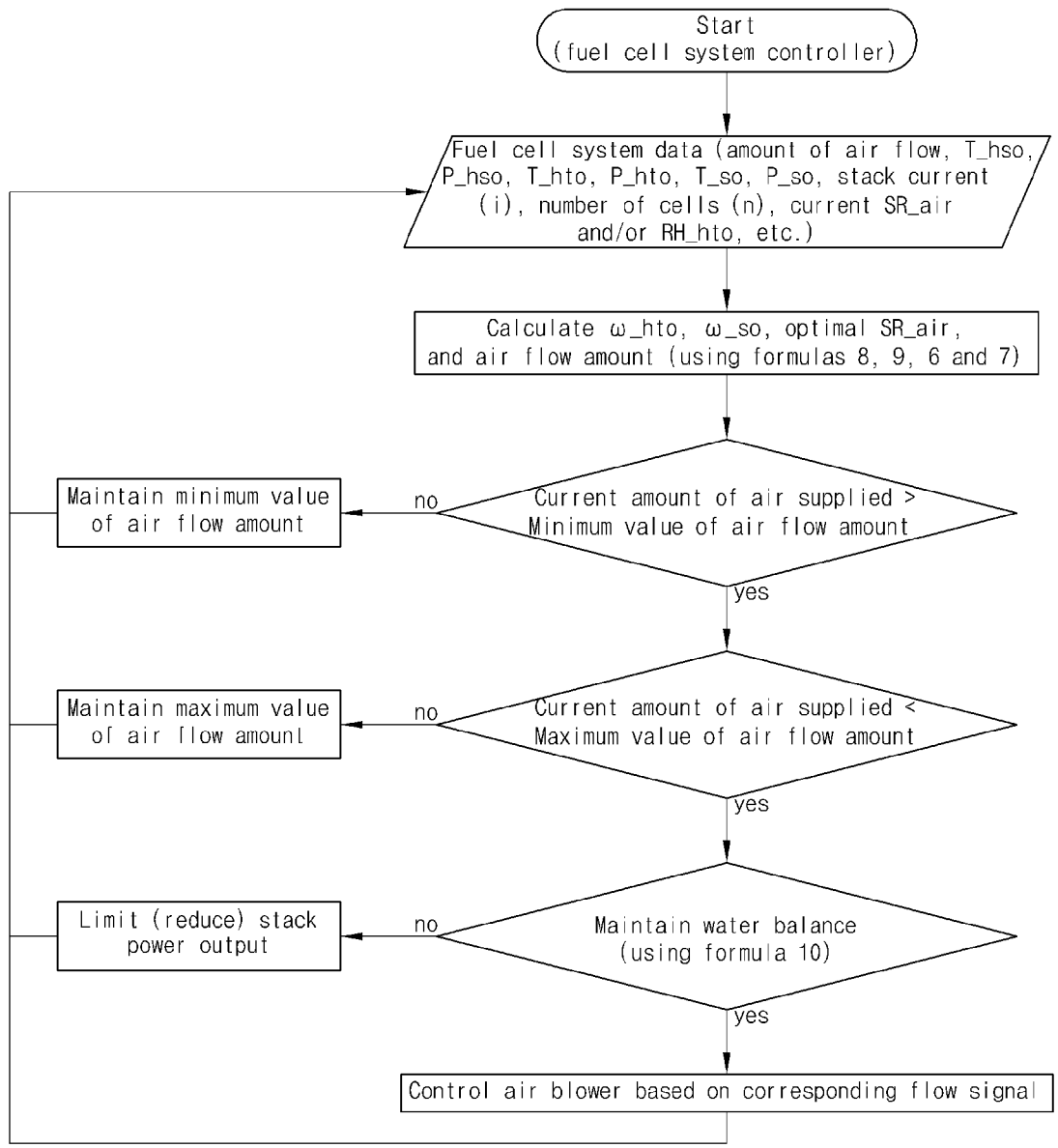
FIG. 2 is a flowchart illustrating an exemplary method for controlling the amount of air supplied to a fuel cell in accordance with preferred embodiments of the present invention.

According to preferred embodiments of the invention and as exemplified in FIG. 1, FIG. 1 is a block diagram illustrating a preferred method for controlling the amount of air supplied to a fuel cell in accordance with the present invention. FIG. 2 is a flowchart illustrating a method for controlling the amount of air supplied to a fuel cell in accordance with other preferred embodiments of the present invention.

Preferably, an air supply system of a fuel cell system of the present invention includes an air flow sensor (AFS) 12 for suitably measuring the amount of air flow, an air blower 14 for suitably supplying outside air to a cathode of a fuel cell stack 10, and a humidifier 16 for suitably humidifying the air supplied from the air blower 14 and supplying the humidified air to the cathode of the stack 10.

Accordingly, wet air containing vapor is suitably introduced from the outlet of the stack 10 to the humidifier 16 and, at the same time, the humidifier 16 suitably humidifies the outside air (dry air) supplied from the air blower 14 and passing through the humidifier 16. Preferably, the thus humidified air is suitably supplied to the cathode of the stack 10.

In certain exemplary embodiments, for example as shown in FIG. 1, as control factors suitably transmitted to a stack controller, (m_air) represents the amount of air supplied, command represents an rpm control command for the air blower, (RH_hto) represents the relative humidity of the humidifier outlet (stack inlet) air, (T_hso) and (P_hso) represent the temperature and pressure of the humidifier exhaust outlet air, (T_hto) and (P_hto) represent the temperature and pressure of the humidifier outlet (stack inlet) air, and (T_so) and (P_so) represent the temperature and pressure of the stack outlet (humidifier exhaust inlet) air.

Preferably, according to further preferred embodiments of the present invention, the method for controlling the amount of air supplied to the fuel cell in accordance with the present invention measures the temperature and pressure (T_hto) and (P_hto) of the humidifier outlet (stack inlet) air, the temperature and pressure (T_so) and (P_so) of the stack outlet air, and the relative humidity (RH_hto) of the humidifier outlet (stack inlet) air, and suitably controls the amount of air supplied to the cathode of the stack based on the measurement results so as to adjust the relative humidity of the stack outlet air to reach a suitable target value.

A method for controlling the amount of air supplied to the fuel cell in accordance with certain preferred embodiments of the present invention is described below.

The relationship between the absolute humidity and the relative humidity according to exemplary embodiments of the present invention is described herein below.

Preferably, the humidity ratio (or absolute humidity) $\omega$ can be expressed as $\omega \equiv m_w/m_a$, wherein $m_w$ represents the mass of water present in the mixture, $m_a$ represents the mass of dry air, and the total mass is $m_w + m_a$.

Preferably, the relative humidity $\Phi$ can be expressed as $\Phi \equiv Pw/Psat$, wherein Pw represents the partial vapor pressure and Psat represents the saturated vapor pressure of water.

In further embodiments, according to Dalton's law, the relationship between the absolute humidity and the relative humidity can be preferably expressed as the following formula 1:

$$\omega = \frac{Mw}{Ma} = 0.622 \times \frac{Pw}{Pa} = \quad \text{[Formula 1]}$$
$$0.622 \times \frac{Pw}{Ptotal - Pw} = 0.622 \times \frac{\varphi \times Psat}{Ptotal - \varphi \times Psat}$$

Accordingly, in further related embodiments, as it is known that the amount of water (mdot_water_gen) generated by the electrochemical reaction in the stack of the fuel cell system, the amount of water (mdot_water_hum) contained in air humidified by the humidifier and supplied to the cathode, and the amount of air (mdot_exh) exhausted from the stack outlet can preferably be obtained through the following formulas 2 to 4:

$$\text{mdot\_water\_gen} = 9.34 \times 10^{-8} \times Pe/Vc \text{(kg/sec)} \quad \text{[Formula 2]}$$

$$\text{mdot\_water\_hum} = \omega_{htc} \times (3.57 \times 10^{-7} \times SR_{air} \times Pe/Vc) \text{(kg/sec)} \quad \text{[Formula 3]}$$

$$\text{mdot\_exh} = (3.57 \times 10^{-7} \times SR_{air} - 8.29 \times 10^{-8}) \times Pe/Vc \text{(kg/sec)} \quad \text{[Formula 4]}$$

According to further related embodiments of the present invention, the absolute humidity of the stack outlet air can be expressed as the following formula 5 according to the definition of formula 1:

$$\omega_{so} = \frac{(\text{mdot\_water\_gen}) + (\text{mdot\_water\_hum})}{(\text{mdot\_exh})} \quad [\text{Formula 5}]$$

Accordingly, if formulas 1 to 3 are substituted into formula 5, the following formula 6 for preferably determining the stoichiometric ratio of air can be obtained:

$$SR_{air} = \frac{\omega_{so} + 1.1267}{4.3064 \times (\omega_{so} - \omega_{hto})} \quad [\text{Formula 6}]$$

Further, since the stoichiometric ratio of air $SR_{air}$ is {(actual amount of air supplied)/(theoretical amount of air or air consumption)} and the air consumption is $3.57 \times 10^{-7} \times Pe/Vc$, the actual amount of air supplied mdot_airin can be expressed as the following formula 7:

$$\text{mdot\_airin} = 3.57 \times 10^{-7} \times SR_{air} \times \frac{Pe}{Vc} \text{ (kg/sec)} = \quad [\text{Formula 7}]$$
$$3.57 \times 10^{-7} \times SR_{air} \times i \times n \text{ (kg/sec)}$$

According to preferred embodiments of the present invention, and as shown in formula 7, i (stack current) represents Pe/Vc and n represents the number of cells in the stack.

Further, according to other further embodiments, the absolute humidity of the humidifier outlet (stack inlet) air and the absolute humidity of the stack outlet (humidifier inlet) air can be suitably obtained through the following formula 8 and 9:

$$\omega_{hto} = 0.622 \times \frac{\overset{60\% \text{ (Table or Estimated Value)}}{RH_{hto} \times P_{sat}(T_{hto})}}{P_{hto} - \underset{60\% \text{ (Table or Estimated Value)}}{RH_{hto}} \times P_{sat}(T_{hto})} \quad [\text{Formula 8}]$$

$$\omega_{so} = 0.622 \times \frac{\overset{100\% \text{ (Target value)}}{RH_{so} \times P_{sat}(T_{so})}}{P_{so} - \underset{100\% \text{ (Target Value)}}{RH_{so}} \times P_{sat}(T_{so})} \quad [\text{Formula 9}]$$

Accordingly, in further preferred embodiments, if formulas 8 and 9 are preferably substituted into formula 6, it is possible to determine the stoichiometric-ratio of air for maintaining the relative humidity of the stack outlet air 100%, and if the determined stoichiometric ratio of air $SR_{air}$ is substituted into formula 7, it is possible to suitably determine the amount of air supplied (mdot_airin).

Accordingly, when the temperature and pressure (T_hto) and (P_hto) of the humidifier outlet (stack inlet) air, the temperature and pressure (T_so) and (P_so) of the stack outlet (humidifier exhaust inlet) air, and the relative humidity (RH_hto) of the humidifier outlet air are known, it is possible to obtain the absolute humidity $\omega_{hto}$ of the humidifier outlet air and the absolute humidity $\omega_{so}$ of the stack outlet air by suitably substituting the those values into formulas 8 and 9. Further, when the thus obtained absolute humidities are substituted into formula 6, the stoichiometric ratio of air $SR_{air}$ can be suitably obtained. Finally, it is possible to suitably determine the optimal amount of air that adjusts the relative humidity of the stack outlet air to reach 100%±α (target value) by suitably substituting the stoichiometric ratio of air $SR_{air}$ into formula 7.

According to further preferred embodiments, the absolute humidity ω can be suitably expressed as a function of relative humidity, temperature, and pressure. Assuming, preferably, that the target value of the relative humidity of the stack outlet air RH_so is 100% as shown in formula 9, the absolute humidity of the stack outlet air $\omega_{so}$ is only the function of temperature and pressure.

In further preferred embodiments, assuming that the target value of the relative humidity of the humidifier outlet air (RH_hto) is 60% (target function), the absolute humidity of the humidifier outlet air $\omega_{hto}$ is only the function of temperature and pressure.

Accordingly, in the case where the relative humidity (RH_hto) of the humidifier outlet air is preferably estimated or a map is used, it is possible to suitably control the target relative humidity of the stack outlet air (RH_so) or the stoichiometric ratio of air ($SR_{air}$).

In other related embodiments, it is possible to determine the stoichiometric ratio of air ($SR_{air}$) for suitably maintaining the relative humidity of the stack outlet air 100% by directly measuring the relative humidity (RH_hto) of the humidifier outlet air using an RH sensor or by estimating the relative humidity (RH_hto) of the humidifier outlet air according to the test results obtained previously using the relationship between the temperature of the humidifier outlet air and the amount of air flow. Further, it is possible to suitably determine the actual amount of air (mdot_airin) supplied to the cathode of the stack by substituting the thus determined stoichiometric ratio of air $SR_{air}$ into formula 7.

In further preferred embodiments, the amount of air supplied to the cathode of the stack, determined through formula 7, has suitable maximum and suitable minimum values that fall within the range that can maintain the water balance in the stack and prevent the flooding (over-condensation) from occurring in the stack outlet. Preferably the maximum value required in the stack is suitably determined as the amount of air that can sufficiently discharge the water condensed by a predetermined amount of flooding, and the minimum value is determined in a range within which the stack can operate, i.e., $SR_{air}$=1.5 to 1.8.

In further preferred exemplary embodiments of the invention, the operation temperature of the stack is suitably maintained at an appropriate level by preferably detecting cooling water temperature using a thermostat, a component of a thermal management system (TMS). If the amount of water discharged through the humidifier exhaust outlet is greater than the amount of water generated in the stack as defined in conditions of the following formula 10 using the temperature and pressure (T_hso) and (P_hso) of the humidifier exhaust outlet air (which can be estimated from atmospheric pressure), it is possible to limit the power output of the stack so as to suitably maintain the water balance of the stack.

$$\text{mdot\_ex} \times \omega_{hso} \geq \text{hmdot\_water\_gen} \quad [\text{Formula 10}]$$
$$\therefore \frac{22.205 \times SR_{air} \times P_{sat}(T_{hso})}{P_{hso} - P_{sat}(T_{hso})} - 9.34 \leq 0$$

Preferably, according to the present invention, since the amount of air supplied to the stack is variably controlled within a predetermined range based on the stack operation conditions (operation temperature and pressure) such that the relative humidity of the stack outlet air is maintained within 100%, it is possible to suitably prevent flooding (over-condensation) from occurring in the fuel cell stack and, at the same time, prevent dry-out of the polymer electrolyte membrane in the stack, thus suitably improving the durability of the stack and the operational stability.

Further, when the amount of water discharged to the outside is greater than the amount of water generated in the stack, it is possible to suitably maintain the water balance in the stack constant by limiting the power output of the stack.

In further related embodiments of the present invention, during fuel cell cold start or start-up (before the fuel cell system reaches a normal temperature), the amount of water remaining in the stack is suitably maintained at minimal, thus improving the cold-startability.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling an amount of air supplied to a fuel cell, the method comprising:
    measuring, by a controller, i.) a temperature and pressure of air passing through an outlet of a humidifier that fluidly communicates with a stack outlet, ii.) a temperature and pressure of stack inlet air, and iii.) a relative humidity of air passing through the outlet of the humidifier;
    determining, by the controller, a stoichiometric ratio of air or an amount of air supplied to the stack based on the measurement results to adjust the relative the relative humidity of the stack outlet air to reach a target value
    determining, by the controller, whether an amount of water passing through the humidifier and discharged through the humidifier outlet is greater than an amount of water generated in the stack even after the stack is operated at a minimum value of the stoichiometric ratio determined in a range within which the stack can operate; and
    in response to determining that the amount of water passing through the humidifier and discharged through the humidifier outlet is greater than the amount of water generated in the stack even after the stack is operated at the minimum value, reducing, by the controller, a power output of the stack to maintain a water balance within the stack.

2. The method of claim 1, wherein the target value of the relative humidity of the stack outlet air is in the range of 90 to 120%.

3. The method of claim 1, wherein the stoichiometric ratio of air is determined by obtaining an absolute humidity of the humidifier outlet air and an absolute humidity of the stack outlet air based on the temperature and pressure of the humidifier outlet air, the temperature and pressure of the stack outlet air, and the relative humidity of the humidifier outlet air, and substituting the thus obtained absolute humidities into a specific stoichiometric formula.

4. The method of claim 1, wherein the amount of air supplied is determined in a range between a maximum value that can discharge the water condensed by flooding occurring in the stack and a minimum value determined in a range within which the stack can operate.

* * * * *